United States Patent [19]
Delprat et al.

[11] Patent Number: 5,583,870
[45] Date of Patent: Dec. 10, 1996

[54] DUMMY BURST STRUCTURE IN A CELLULAR DIGITAL RADIO-COMMUNICATIONS SYSTEM USING THE TDMA PRINCIPLE, AND A BASE STATION FOR GENERATING SUCH A STRUCTURE

[75] Inventors: Marc Delprat, Le Chesnay; Frédéric Gourgue, Paris, both of France; Eric Pequet, Jamioulx, Belgium

[73] Assignee: Alcatel Mobile Communication France, Paris, France

[21] Appl. No.: 313,798

[22] Filed: Sep. 28, 1994

[30] Foreign Application Priority Data

Sep. 29, 1993 [FR] France .................. 93 11572

[51] Int. Cl.$^6$ .................. H04J 3/06; H04J 3/12
[52] U.S. Cl. .................. 370/337; 370/350; 370/522
[58] Field of Search .................. 370/95.1, 95.3, 370/110.1, 111, 118, 110.4, 85.7, 100.1, 105.1, 105.2, 105.3, 105.4, 105.5, 105.6, 109, 94.1, 92, 93, 98; 455/67.1, 62, 51.1, 17, 53.1; 375/354, 362, 363, 365

[56] References Cited

U.S. PATENT DOCUMENTS 3,995,119  11/1976  Pachynski, Jr. .................. 370/111
4,715,033  12/1987  Saburi .................. 370/95.3
4,754,453  6/1988  Eizenhöfer .................. 455/51.1
5,187,807  2/1993  Alard et al. .................. 455/17
5,361,258  11/1994  Arnold et al. .................. 370/953

FOREIGN PATENT DOCUMENTS

0540808A2  5/1993  European Pat. Off. .
3130176A1  2/1983  Germany .
WO9100660  1/1991  WIPO .

Primary Examiner—Wellington Chin
Assistant Examiner—Huy D. Vu
Attorney, Agent, or Firm—Sughrue, Mion, Zinn, Macpeak & Seas

[57] ABSTRACT

The present invention relates to a dummy burst structure used in a cellular digital radio-communications system operating on the principle of time division multiple access, each cell in the system being associated with a beacon frequency subdivided into periodically-repeated frames, each of which comprises at least one signalling channel or beacon path for transmitting signalling messages to mobile stations, the other channels serving in particular to transmit useful data, the burst being transmitted over those channels of the beacon frequency which are not assigned to transmitting useful data, or over certain time slots of the signalling channel when there is no signalling data to be transmitted over the certain time slots, wherein the burst contains a signalling message.

10 Claims, 1 Drawing Sheet

DUMMY BURST STRUCTURE IN A CELLULAR DIGITAL RADIO-COMMUNICATIONS SYSTEM USING THE TDMA PRINCIPLE, AND A BASE STATION FOR GENERATING SUCH A STRUCTURE

The present invention relates to a dummy burst structure in a cellular digital radiocommunications system using the principle of time division multiple access (TDMA). It also relates to a base station of the system, which base station is used for generating such a burst structure.

BACKGROUND OF THE INVENTION

In cellular digital radiocommunications systems, each cell, which covers a given geographical zone, is provided with a base transceiver station (referred to merely as a "base station") serving as an interface between firstly a mobile station located substantially inside the geographical zone covered by the cell, and secondly either the management network for managing the radiocommunications system, or else another mobile station.

Each base station is associated with at least one transmission frequency in the down direction (base to mobile); a corresponding transmission frequency in the up direction corresponds to the down frequency. The expression "transmission frequency" is used below to designate a down transmission frequency. No further mention is made of up transmission frequencies, it being understood that there is one up transmission frequency per down transmission frequency.

In systems using the TDMA principle, each transmission frequency is subdivided into frames that are repeated following a periodic pattern. Each frame is itself subdivided into time slots, a periodically-repeated time slot of given rank constituting a transmission channel.

The transmission channels include at least one signalling channel or beacon path over which signalling messages are transmitted, and traffic channels for transmitting useful data (speech or data in other forms). In general, the signalling channel corresponds to the first time slot of each frame on a specific transmission frequency referred to as the "beacon frequency". The beacon frequency is characteristic of the cell. For example, the rank of the first time slot is identified by the number 0 in systems complying with the GSM standard, and by the number 1 in systems complying with the future TETRA standard.

The signalling channel is itself constituted by a plurality of sub-channels, each sub-channel also being repeated following a periodic pattern that is specific to it.

Therefore, both signalling messages and useful data can be transmitted on the beacon frequency. When there is a very large amount of call traffic in the cell, a plurality of other transmission frequencies may be used to satisfy needs, i.e. to transmit useful data.

In certain systems, e.g. systems complying with the future TETRA standard, an auxiliary beacon frequency is provided in addition to the main beacon frequency so that signalling messages can be transmitted when traffic is such that the main beacon frequency no longer suffices, and/or when, for security reasons, transmitting all the signalling messages on the same frequency is to be avoided.

The signalling messages or the useful data are transmitted over the appropriate channels in the form of packets or bursts.

When a mobile station, which is initially in standby mode, seeks to be connected to the management network for managing the radiocommunications system, it must determine the beacon frequency of the cell in which it is located. Since TDMA is being used, the mobile station must then become synchronized with the base station of the cell so that it uses the proper channel, i.e. the proper time slot.

In the same way, when a mobile station located in a given cell is inactive with respect both to transmission and to reception and optionally if the signal received from the base station of the cell in which the mobile station is located does not have sufficient power or a sufficient bit error rate (BER), the mobile station must "listen" to the beacon frequencies of the neighboring cells so as to measure the power (or the BER) of the signal received on those frequencies. The mobile station must also be synchronized with the neighboring cells so as to prepare for the possibility of handover being performed from the cell in which it is located to the cell having a beacon frequency that is received, for example, at a power level that is higher than the power level of the beacon frequency of the cell in which the mobile station is located.

For that purpose, it is essential for the base station to transmit continuously on the beacon frequency.

This poses no problems when the signalling channel and all of the traffic channels carried by the beacon frequency are used.

Unfortunately, e.g. when there is a small amount of call traffic, certain traffic channels might not be used, or even, at certain times, the signalling channel might not be used to 100% of its capacity, so that certain time slots on that channel are not used. In which case, "dummy" bursts are transmitted. The structure of such bursts is predetermined and is such that they cannot be confused with signalling bursts, so that when it hears them, the mobile station knows that they are not signalling bursts.

Such dummy bursts are transmitted by the base station under the control of the network, as soon as a channel or a time slot of a channel (sub-channel) is not used on the main beacon frequency, or, where applicable, on the auxiliary beacon frequency.

To become synchronized with the base station of a determined cell, once the beacon frequency of that cell has been detected, the mobile station must search for a "synchronization" burst.

The synchronization burst is transmitted following a periodic repetition pattern over a sub-channel of the beacon path. In a system complying with the GSM standard, the transmission period of the synchronization burst is about 0.04 seconds (s); in a system complying with the future TETRA standard, the transmission period of the synchronization burst is about 1 s.

Therefore, at certain times, as a function of the operating mode to which it has been programmed, the mobile station seeking to become synchronized "listens" to what is transmitted on the beacon frequency. During the entire "synchronization acquisition" period, the mobile station cannot transmit signalling data or useful data to the new cell, nor can it receive signalling data or useful data therefrom.

Therefore, during an access procedure, a considerable amount of time might be required for synchronization acquisition. During a call reestablishment procedure (e.g. a handover procedure in systems complying with the GSM standard), the call in progress might be interrupted so long as synchronization is not acquired, it being possible for the synchronization acquisition time to be longer than 20 s (in systems complying with the future TETRA standard).

Naturally, both of these situations are highly detrimental.

OBJECTS AND SUMMARY OF THE INVENTION

An object of the present invention is to reduce the time required for a mobile station to acquire synchronization.

To this end, the present invention provides a dummy burst structure used in a cellular digital radio-communications system operating on the principle of time division multiple access, each cell in the system being associated with a beacon frequency subdivided into periodically-repeated frames, each of which comprises at least one signalling channel or beacon path for transmitting signalling messages to mobile stations, the other channels serving in particular to transmit useful data, said burst being transmitted over those channels of said beacon frequency which are not assigned to transmitting useful data, or over certain time slots of the signalling channel when there is no signalling data to be transmitted over said certain time slots, wherein said burst contains a signalling message.

The invention enables all of the signalling messages to be repeated more often regardless of their contents, and in particular the information contained in the synchronization sub-channel. In this way, whenever dummy bursts are necessary, the mobile stations can become synchronized more rapidly than in the prior art.

The signalling message contained in the dummy burst may contain synchronization information addressed to mobile stations located in or in the vicinity of a cell that is associated with the beacon frequency on which the burst is transmitted, or else the signalling message contained in the dummy burst may contain firstly synchronization data addressed to mobile stations located in or in the vicinity of a cell that is associated with the beacon frequency on which the burst is transmitted, and secondly other signalling data.

Advantageously, the synchronization data contained in the dummy burst includes a "training" sequence which can be recognized by the mobile station(s) to which it is addressed.

When, in addition to using the above-mentioned beacon frequency, which is referred to as the "main" frequency, for transmitting the signalling messages, the system also uses an auxiliary beacon frequency, the dummy bursts on the auxiliary beacon frequency have the same structure as the dummy bursts used on the main beacon frequency.

In a method of transmitting signalling messages that is advantageous for implementing the present invention, the signalling messages transmitted over the beacon path include data addressed to the mobile station(s) that are already synchronized, which data indicates that the dummy bursts transmitted over those channels of said beacon frequency which are not assigned to transmitting useful data, or over those time slots of said signalling channel which are not used for transmitting signalling messages contain signalling data to be acquired.

A method of allocating a traffic channel, which method is also advantageous for implementing the present invention, consists, when frequencies other than the beacon frequency are available for traffic, in allocating traffic channels on those frequencies first and foremost, so as to leave the traffic channels of the beacon frequency free for the purposes of transmitting dummy bursts of the invention.

The present invention also provides a base station in a cellular digital radiocommunications system operating on the principle of time division multiple access, said base station including in particular transceiver means and control software, and being such that, in response to a command received from management means for managing the radio resources of the system, which command indicates which of the traffic channels of said beacon frequency are not used for transmitting useful data, and which of the time slots of said signalling channel are not used for transmitting signalling messages, the software controls burst-generating means for generating bursts having structures of the invention, the bursts being transmitted by said transceiver means either during the time slots corresponding to those channels of said beacon frequency which are not assigned to transmitting useful data, or else during those time slots of said signalling channel which are not used for transmitting signalling messages.

The software may be programmed so as to control the transmission of dummy bursts whose contents are a function of the traffic channels that are not used for transmitting useful data or of the time slots of said signalling channel that are not used.

Furthermore, the software may control the transmission of signalling messages by said transceiver means over said beacon channel, which signalling messages contain data indicating to the mobile stations that are already synchronized which of the traffic channels are used to transmit said dummy bursts that may also contain signalling.

The invention also provides a radio resources management member for managing the radio resources of the radiocommunications system, which member is adapted to implementing the above-described allocation method.

BRIEF DESCRIPTION OF THE DRAWING

Other characteristics and advantages of the present invention will appear on reading the following description of an implementation of the present invention given by way of non-limiting example, and with reference to the accompanying drawing, in which.

Common elements are given the same references in all of the figures.

MORE DETAILED DESCRIPTION

Figure 1A:
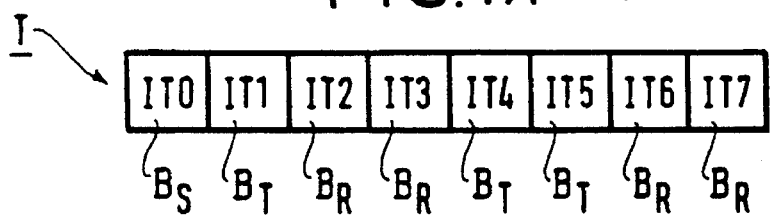
FIG. 1A shows a simple frame structure as used in a conventional cellular digital radiocommunications system.

FIG. 1A shows a frame structure T carried by the beacon frequency of a cell $C_1$ (see FIG. 2) in a cellular digital radiocommunications system. Frame structure T is described in part in the preamble.

In systems complying with the GSM standard, frame T is subdivided into eight time slots. Each time slot IT0 to IT7 has a duration equal to the duration of one or more bursts, depending on the type of burst conveyed by the time slot.

As explained above, the time slot of rank 0 (IT0) serves to transmit signalling messages constituted by one or more signalling bursts $B_S$.

The seven other time slots IT1 to IT7 are reserved for transmitting useful data. In this way, each time slot IT1 to IT7 constitutes a traffic channel that is allocated to a mobile station when the mobile station is to set up a call.

Figure 2:
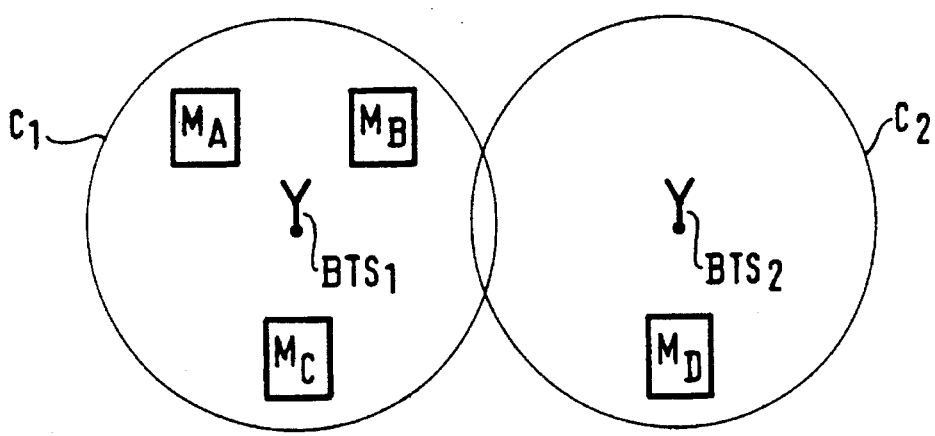
FIG. 2 is a diagram showing two cells in a cellular digital radiocommunications system.

In the example shown in FIG. 2, three mobile stations $M_A$, $M_B$, and $M_C$ are involved in calls under the coverage of base station $BTS_1$ of cell $C_1$. The channels corresponding respectively to time slots IT1, IT4, and IT5 have been allocated to them. Therefore, useful data in the form of normal traffic bursts $B_T$ is transmitted during those time slots.

Since no other mobile is involved in a call under the coverage of BTS1, time slots IT2, IT3, IT6, and IT7 are not used to transmit useful data. Conventionally, in the prior art, those time slots are occupied by dummy bursts $B_R$, which have a structure such that they contain no information addressed to the mobile stations, and it is impossible for the mobile stations to confuse them with any other type of burst.

In accordance with the invention, instead of occupying time slots IT2, IT3, IT6, and IT7 with dummy bursts having the above-indicated structure, dummy bursts containing signalling information are used.

Conventionally, the signalling bursts have:

either the structure of "normal" bursts, i.e. they have a structure that is identical to the structure of bursts containing useful data, and, once a mobile station has become synchronized with the base station of the cell in which the mobile station is located, the mobile station distinguishes signalling bursts from useful data bursts because they are transmitted over the beacon path and they contain a destination address (not necessarily a corresponding address);

or else a specific structure that is different from the structure of normal bursts, e.g. such as the structure of synchronization bursts or of frequency correction bursts in systems complying with the GSM standard; each such synchronization burst includes in particular a characteristic "training" sequence that is distinct from (in particular longer than) the training sequence used in normal bursts, so that a mobile station that is not synchronized with the base station and that, at certain times, "listens" to everything that is transmitted over a signalling channel is capable of detecting a synchronization burst.

Figure 1B:
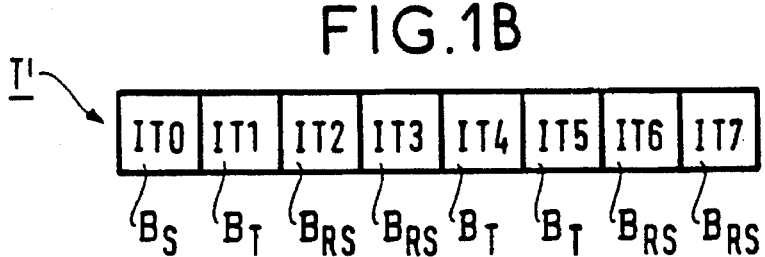
FIG. 1B shows a simple frame structure as used in a cellular digital radiocommunications system using dummy bursts having the structure of the invention.

FIG. 1B shows the structure of frame T as modified to form a structure T' in which time slots IT2, IT3, IT6, and IT7 contain dummy bursts that are modified to contain signalling data. The dummy bursts of the invention are referenced $B_{RS}$. In this way, if a mobile station $M_D$ located under the coverage of the base station $BTS_2$ of a neighboring cell $C_2$ of cell $C_1$ is to become synchronized with base station $BTS_1$, after it has detected the beacon frequency thereof, and if it has not identified the first burst $B_S$ carried by time slot IT0, it does not need to wait for 0.04 s (GSM standard) for the following IT0 (in a system complying with the TETRA standard, it is recalled that the signalling channel is given rank 1 and that conventionally the synchronization burst is repeated about once every second).

In accordance with the invention, the synchronization burst is repeated during time slots IT2, IT3, IT6, and/or IT7, so that if the mobile station $M_D$ has not identified the synchronization burst transmitted in time slot IT0, it can identify the synchronization burst transmitted over another time slot before the next time slot of rank 0.

In this way, the synchronization acquisition time is reduced significantly. In a system complying with the TETRA standard, while a mobile station is accessing a given cell (e.g. while mobile station MD is accessing cell $C_1$), the lapse of time during which the useful data is not transmitted, i.e. the time synchronization acquisition time, is reduced from 20 s to less than 0.5 s.

In the same way, during handover of the mobile station MD (e.g. from cell $C_2$ to cell $C_1$), the synchronization acquisition time is reduced so that the risks of the call in progress being cut off are smaller.

Moreover, the invention makes it possible either to listen to more adjacent cells or else to reduce "monitoring" periods during which it is necessary to listen to the beacon frequencies of the adjacent cells, thereby making it possible to reduce the consumption of the mobile.

Naturally, in accordance with the invention, the structure of the dummy bursts may be varied.

In this way, as described above, a structure may be chosen such that each dummy burst contains a synchronization burst which can be identified easily by the mobile station by means of its specific training sequence.

In a system complying with the future TETRA standard, the synchronization burst (BSCH) has a duration equal to half that of the allotted time slot, so that, in the dummy burst of the invention, the synchronization burst can be associated with another signalling burst, e.g. such as an information burst giving information on the type of network to which the cell in question belongs (BNCH). In this way, during the period for which synchronization acquisition is being sought, once the mobile station has identified the synchronization burst by means of its specific training sequence, the mobile station also has access to certain other signalling information.

In this way, it may be decided that each dummy burst shall contain a synchronization burst of the BSCH type and a distinct signalling burst; e.g. the first available dummy burst contains a synchronization burst and an information burst giving information on the type of network (BNCH), the second available dummy burst contains a synchronization burst and a signalling burst addressed to a specific mobile station, the third dummy burst contains a synchronization burst and a signalling burst addressed to a group of mobile stations, etc.

If dummy bursts having the structure of the invention are used to transmit signalling messages to mobile stations that are already synchronized, it is necessary to indicate to the mobile stations that they must "listen" to the corresponding time slots.

For that purpose, in an implementation of the present invention, in the common signalling messages transmitted over the beacon path, information bits are used to indicate to the already-synchronized mobile stations the ranks of the time slots to which to listen to find additional signalling messages. Such signalling messages may be generated by the base station.

In this way, signalling message transmission is managed dynamically, and resources are therefore used better.

In compliance with the TETRA standard, in addition to the above-mentioned main beacon frequency, there may be one or more "auxiliary" beacon frequencies. Naturally, in all cases in which a plurality of beacon frequencies exist on which continuous transmission is required, the invention applies in the same way to each of them.

In order to optimize the time required for the mobile stations to acquire synchronization when a cell uses a beacon frequency and one or more additional traffic frequencies, it is also possible, in accordance with the invention, to allot first and foremost traffic channels on traffic frequencies other than the beacon frequency, so as to reserve as much as possible the free time slots on the beacon frequency for transmitting dummy bursts of the invention.

Figure 3:
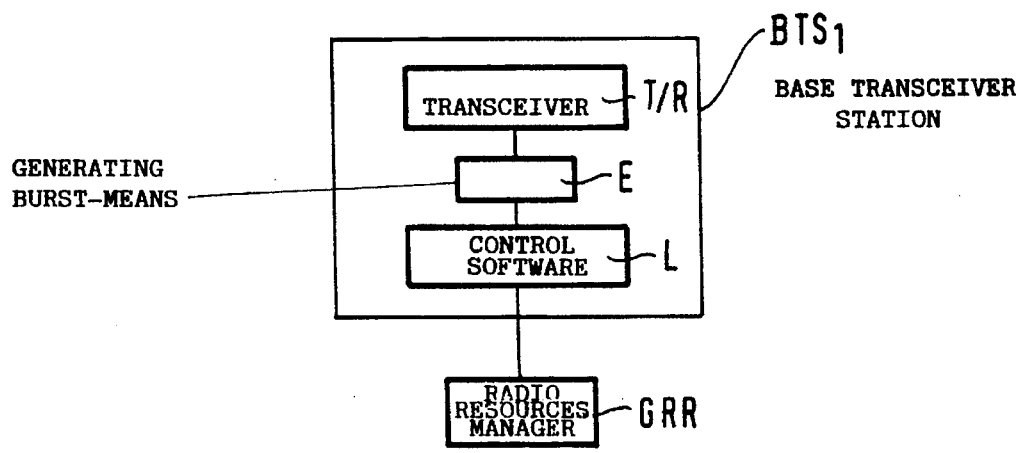
FIG. 3 is a diagram showing the elements of a base transceiver station involved in implementing the present invention.

A base station, e.g. such as base station $BTS_1$, adapted to implementing the invention, is such that it includes, in particular (see FIG. 3):

a transceiver T/R capable of transmitting dummy bursts having the structure of the invention during the time slots corresponding to traffic channels of the beacon frequency that are not assigned to transmitting useful data, or to those time slots of the signalling channel which are not used for transmitting signalling messages; and operating software L for controlling means E for generating dummy bursts having a structure in compliance with the structure of the invention.

The software L is controlled by a radio resources management member GRR situated, for example, at BTS level (but which may also be located at network level, depending on the architecture chosen), which member indicates to the base station the ranks of those traffic channels of the beacon frequency which are not assigned to transmitting useful data, or those of the time slots of the signalling channel which are not used for transmitting signalling messages, i.e. the time slots over which it is necessary to transmit dummy bursts. The software L of the base station is modified in accordance with the invention so that the base station transmits dummy bursts of the invention during those time slots instead of conventional dummy bursts.

Where applicable, the algorithm programmed in the software L may in particular include indications about the type of dummy bursts to be transmitted, depending on the available time slots, and depending on the signalling messages chosen to be transmitted via the dummy bursts of the invention.

The software L of the base station must be modified so as to control transmission, over the signalling channel, of signalling messages indicating to the already-synchronized mobile stations the ranks of the time slots other than IT0 to which they must listen on the beacon frequency in order to obtain other signalling information.

The radio resources management member(s) at network level may also be modified in accordance with the invention so that:

when additional traffic frequencies are used, the traffic channels are allocated first and foremost on those traffic frequencies; and where applicable, when dummy bursts of the invention are transmitted to mobile stations that are already synchronized, the base station is informed of which type of dummy bursts to transmit as a function of the available time slots.

Naturally, the invention is not limited to the above-described implementation.

In particular, it does not apply only to cellular systems complying with the GSM standard. It may apply in particular to systems complying with the future TETRA standard, in which each of the frames contains four time slots only.

Finally, any means may be replaced with equivalent means without going beyond the ambit of the invention.

We claim:

1. A dummy burst used in a cellular digital radio-communications system operating on the principle of time division multiple access, each cell in the system being associated with a beacon frequency subdivided into periodically-repeated frames, each of which comprises at least one signalling channel or beacon path for transmitting signalling messages to mobile stations, and a plurality of other channels serving in particular to transmit useful data, said dummy burst being transmitted over those other channels of said beacon frequency which are not assigned to transmitting useful data, or over certain time slots of the signalling channel when there is no signalling data to be transmitted over said certain time slots, thereby offering a continuous reception of said beacon frequency by said mobile stations, wherein said dummy burst contains synchronization data addressed to mobile stations located in the vicinity of a cell that is associated with the beacon frequency on which said dummy burst is transmitted.

2. A burst according to claim 1, wherein said dummy burst contains firstly synchronization data addressed to mobile stations located in or in the vicinity of a cell that is associated with the beacon frequency on which the dummy burst is transmitted, and secondly other signalling data.

3. A burst according to claim 1, wherein said synchronization data includes a "training" sequence which can be recognized by the mobile station(s) to which it is addressed.

4. A burst according to claim 1, wherein, when, in addition to using said beacon frequency, which is referred to as the "main" frequency, for transmitting said signalling messages, said system also uses an auxiliary beacon frequency, the dummy bursts on said auxiliary beacon frequency have the same structure as the dummy bursts used on said main beacon frequency.

5. A method of transmitting signalling messages to mobile stations travelling within the coverage regions of a cell in a cellular digital radio-communications system operating on the principle of time division multiple access, said cell in the system being associated with a beacon frequency subdivided into periodically-repeated frames, each of which comprises at least one signalling channel or beacon path for transmitting signalling messages to said mobile stations, and a plurality of other channels serving in particular to transmit useful data;

wherein the signalling messages transmitted over the beacon path include data addressed to those of said mobile stations which are already synchronized, which data indicates that dummy bursts which are provided to offer a continuous reception of said beacon frequency by said mobile stations and which are transmitted over those other channels of said beacon frequency which are not assigned to transmitting useful data, or over those time slots of said signalling channel which are not used for transmitting signalling messages contain signalling data to be acquired.

6. A method of allocating a traffic channel in a cellular digital radio-communications system operating on the principle of time division multiple access, each cell in the system being associated with a beacon frequency subdivided into periodically-repeated frames, each of which comprises at least one signalling channel or beacon path for transmitting signalling messages to mobile stations, and a plurality of traffic channels serving in particular to transmit useful data, a dummy burst being transmitted over those traffic channels of the beacon frequency which are not assigned to transmitting useful data, or over certain time slots of the signalling channel when there is no signalling data to be transmitted over said certain time slots, thereby offering a continuous reception of said beacon frequency by said mobile stations;

wherein said dummy burst contains a signalling message, and wherein, when frequencies other than the beacon frequency are available for traffic, the method consists in allocating traffic channels on those frequencies first and foremost, so as to leave the traffic channels of the beacon frequency free for the purposes of transmitting said dummy burst.

7. A base station in a cellular digital radio-communications system operating on the principle of time division multiple access, said base station including in particular transceiver means and control software, each cell in the system being associated with a beacon frequency subdivided into periodically-repeated frames, each of which comprises at least one signalling channel or beacon path for transmitting signalling messages to mobile stations, and a plurality of traffic channels serving to transmit useful data;

wherein, in response to a command received from management means for managing the radio resources of the system, which command indicates which of the traffic channels of said beacon frequency are not used for transmitting useful data, and which of the time slots of said signalling channel are not used for transmitting signalling messages, said software controls burst-generating means for generating dummy burst which are transmitted by said transceiver means either during the time slots corresponding to those traffic channels of said beacon frequency which are not assigned to transmitting useful data, or else during those time slots of said signalling channel which are not used for transmitting signalling messages, said dummy burst containing signalling messages.

8. A base station according to claim 7, wherein said software is programmed so as to control the transmission of dummy bursts whose contents are a function of the traffic channels that are not used for transmitting useful data or of the time slots of said signalling channel that are not used.

9. A base station according to claim 7, wherein said software controls the transmission of signalling messages by said transceiver means over said beacon channel, which signalling messages contain data indicating to the mobile stations that are already synchronized which of the traffic channels are used to transmit said dummy bursts that may also contain signalling messages.

10. A radio resource management member for communicating with a base station in a cellular digital radio-communications system operating on the principle of time multiple access, said base station being associated with a beacon frequency subdivided into periodically-repeated frames, each of which comprises at least one signalling channel or beacon path for transmitting signalling messages to mobile stations, and a plurality of other channels serving in particular to transmit useful data, dummy burst being transmitted over those other channels of said beacon frequency which are not assigned to transmitting useful data, or over certain time slots of the signalling channel when there is no signalling data to be transmitted over said certain time slots, thereby offering a continuous reception of said beacon frequency by said mobile stations, wherein said member indicates to the base station in which unassigned channels and in which time slots free of signalling message a dummy burst containing a signalling message has to be transmitted.

* * * * *